(12) United States Patent
Crawford et al.

(10) Patent No.: US 10,975,747 B2
(45) Date of Patent: *Apr. 13, 2021

(54) GASEOUS EMISSIONS TREATMENT STRUCTURES

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,213

(22) Filed: Jul. 15, 2019

(65) Prior Publication Data
US 2019/0338688 A1 Nov. 7, 2019

Related U.S. Application Data

(63) Continuation-in-part of application No. 16/367,150, filed on Mar. 27, 2019, now Pat. No. 10,626,766, and
(Continued)

(51) Int. Cl.
*F01N 3/02* (2006.01)
*F01N 3/20* (2006.01)
(Continued)

(52) U.S. Cl.
CPC ......... *F01N 3/2026* (2013.01); *F01N 3/0222* (2013.01); *F01N 3/2013* (2013.01); *F01N 3/2828* (2013.01); *F01N 3/2835* (2013.01); *F01N 9/00* (2013.01); *H05B 6/108* (2013.01); *F01N 2240/05* (2013.01); *F01N 2330/06* (2013.01); *F01N 2330/30* (2013.01); *F01N 2330/34* (2013.01); *F01N 2510/00* (2013.01); *F01N 2900/0602* (2013.01); *Y02T 10/12* (2013.01)

(58) Field of Classification Search
CPC .... F01N 3/0222; F01N 3/2013; F01N 3/2026; F01N 3/2828; F01N 2240/05; F01N 2330/06; F01N 2330/30; F01N 2330/34
See application file for complete search history.

(56) References Cited

U.S. PATENT DOCUMENTS

| | | | | |
|---|---|---|---|---|
| 8,292,987 B2 * | 10/2012 | Gonze | ............... | F01N 13/009 95/1 |
| 2008/0229931 A1 * | 9/2008 | Katsuyama | ............ | F01N 9/002 96/417 |
| 2012/0076699 A1 * | 3/2012 | Ishihara | .................. | H05B 3/42 422/174 |

OTHER PUBLICATIONS

Dianyu Shen et al., "Enhanced Thermal Conductivity of Epoxy Composites Filled with Silicon Carbide Nanowires," Jun. 1, 2017 (Year: 2017).*

* cited by examiner

*Primary Examiner* — Audrey K Bradley
(74) *Attorney, Agent, or Firm* — Stuart L. Wilkinson

(57) ABSTRACT

A gaseous emissions treatment component has a honeycomb substrate along and through which extend elongate cells for the passage of gaseous emissions through the substrate. The cells are bounded by walls dividing adjacent cells from one another. Metal elements occupy and extend along some of the cells. A metal element has an outer surface shape matching the inner surface of an immediately adjacent part of the cell within which the metal element is located.

20 Claims, 2 Drawing Sheets

Related U.S. Application Data a continuation-in-part of application No. 15/972,187, filed on May 6, 2018, which is a continuation-in-part of application No. 15/650,416, filed on Jul. 14, 2017, now abandoned, which is a continuation-in-part of application No. 15/343,533, filed on Nov. 4, 2016, now Pat. No. 10,267,193, which is a continuation-in-part of application No. 15/259,858, filed on Sep. 8, 2016, now Pat. No. 10,352,214, which is a continuation-in-part of application No. 15/259,858, filed on Sep. 8, 2016, now Pat. No. 10,352,214, which is a continuation of application No. 14/452,800, filed on Aug. 6, 2014, now Pat. No. 9,488,085, which is a continuation of application No. 13/971,247, filed on Aug. 20, 2013, now Pat. No. 9,737,851.

(60) Provisional application No. 61/910,067, filed on Nov. 28, 2013, provisional application No. 61/879,211, filed on Sep. 18, 2013, provisional application No. 61/733,949, filed on Dec. 6, 2012, provisional application No. 61/692,732, filed on Aug. 24, 2012.

(51) Int. Cl.
*F01N 3/28* (2006.01)
*H05B 6/10* (2006.01)
*F01N 9/00* (2006.01)
*F01N 3/022* (2006.01)

GASEOUS EMISSIONS TREATMENT STRUCTURES

CROSS REFERENCE TO RELATED PATENTS

The present application is a continuation-in-part of U.S. patent application Ser. No. 15/259,858 entitled "Gaseous emissions treatment structures with induction heating" filed Sep. 8, 2016 which is a continuation of U.S. patent application Ser. No. 14/452,800 entitled "Catalytic converter structures with induction heating" filed Aug. 6, 2014, issuing as U.S. Pat. No. 9,488,085 on Nov. 8, 2016, which claims priority pursuant to 35 U.S.C. § 119(e) from U.S. Provisional Application Ser. No. 61/879,211 entitled "Catalytic converter employing electrohydrodynamic technology" filed Sep. 18, 2013, and from U.S. Provisional Application Ser. No. 61/910,067 entitled "Catalytic converter employing electrohydrodynamic technology" filed Nov. 28, 2013.

The present application is a continuation-in-part of pending U.S. patent application Ser. No. 15/972,187 entitled "Gaseous emissions treatment components and methods for manufacturing thereof" filed May 6, 2018, which is a continuation-in-part of pending U.S. patent application Ser. No. 15/650,416 filed Jul. 14, 2017 and entitled "A catalytic converter component and process for its manufacture", which is a continuation of U.S. patent application Ser. No. 13/971,247 filed Aug. 20, 2013 entitled "Process for manufacturing a component for a catalytic converter" now issued as U.S. Pat. No. 9,737,851, which claims priority pursuant to 35 U.S.C. 119(e) to U.S. Provisional Patent Application 61/692,732 entitled "A catalytic converter component and process for its manufacture," filed Aug. 24, 2012 and U.S. Provisional Application 61/733,949, entitled "A catalytic converter component and process for its manufacture," filed Dec. 6, 2012.

The present application is a continuation-in-part of pending U.S. patent application Ser. No. 15/972,187 entitled "Gaseous emissions treatment components and methods for manufacturing thereof" filed May 6, 2018, which is a continuation-in-part of pending U.S. patent application Ser. No. 15/259,858 filed Sep. 8, 2016 and entitled "Gaseous emissions treatment structures with induction heating", which is a continuation of U.S. patent application Ser. No. 14/452,800 filed Aug. 6, 2014 entitled "Catalytic converter structures with induction heating" now issued as U.S. Pat. No. 9,488,085, which claims priority pursuant to 35 U.S.C. § 119(e) from U.S. Provisional Application 61/879,211 entitled "Catalytic converter employing electrohydrodynamic technology" filed Sep. 18, 2013 and U.S. Provisional Patent Application 61/910,067 entitled "Catalytic converter using field heating of metal component" filed Nov. 28, 2013.

The present application is a continuation-in-part of U.S. patent application Ser. No. 16/367,150 filed Mar. 27, 2019 which is a continuation-in-part of pending U.S. patent application Ser. No. 15/343,533 filed Nov. 4, 2016 entitled "Emission control system with controlled induction heating and methods for use therewith" which claims priority pursuant to 35 U.S.C. § 119(e) from U.S. Provisional Application Ser. No. 62/258,071 filed Nov. 20, 2015 entitled "Catalytic converter system with controlled induction heating and methods for use therewith".

All of the above-mentioned applications are hereby incorporated herein by reference in their entirety and made part of the present U.S. patent application for all purposes.

FIELD OF THE INVENTION

This invention relates to structures for use in treating exhaust gases to reduce harmful pollution.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters and particulate filters are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters and particulate filters have low efficiency when cold, i.e. the running temperature from ambient air start-up temperature to a temperature of the order of 300° C. or "light-off" temperature, being the temperature where the metal catalyst starts to accelerate the pollutant conversion processes previously described. Below light-off temperature, little to no catalytic action takes place. This is therefore the period during a vehicle's daily use during which most of the vehicle's polluting emissions are produced. Getting the catalytic converter hot as quickly as possible is important to reducing cold start emissions.

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
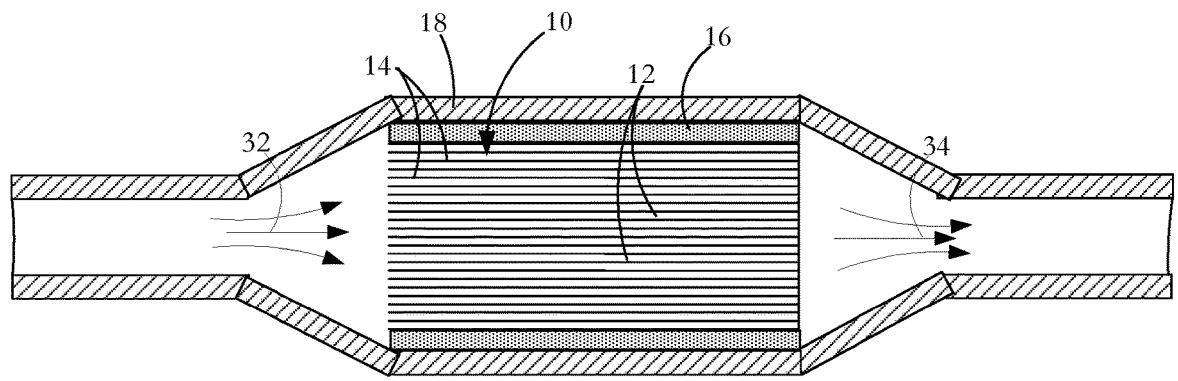
FIG. 1 is a longitudinal sectional view of a prior art gaseous emissions treatment unit.

A gaseous emissions treatment assembly may take any of a number of forms. Typical of these is a catalytic converter having a cylindrical substrate body 10 usually made of ceramic material and often called a brick, an example of which is shown in FIG. 1. The brick has a honeycomb structure in which a number of small area passages or cells 12 extend the length of the brick, the cells being separated by walls 14. There are typically from 400 to 900 cells per square inch (cpsi) of cross-sectional area of the substrate body 10 and the walls are typically in the range 0.003 to 0.008 inches in thickness. Typically, the ceramic substrate body 10 is formed in an extrusion process in which green ceramic material-containing clay or a mix of clay and particulate ceramic-is extruded through an appropriately shaped die and units are cut successively from the extrusion. The units are fired to convert the clay component to ceramic, the units being then cut into bricks. The areal shape of the cells or passages 12 may be whatever is convenient for contributing to the overall strength of the substrate body 10 while presenting a large contact area at which flowing exhaust gases can interact with a hot catalyst coating the interior walls of the cells. In other gaseous emissions treatment such as particulate filters to which the present invention is applicable, there may or may not be catalyst coating on the passage walls. In particulate filters, a checkerboard subset of cells have their front ends plugged, a 'reverse' checkerboard subset of cells have their back ends plugged, and gaseous emissions are treated by being driven though porous walls of the honeycomb structure from cells of the first subset into cells of the reverse subset.

In the catalytic converter, interiors of the cells 12 are wash-coated with a layer containing a particular catalyst material. A wash-coat typically contains a base material, suitable for ensuring adherence to the cured ceramic material of the substrate body, and entrained particulate catalyst material for promoting specific pollution-reducing chemical reactions. Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate body. As an alternative to wash-coating to place catalyst materials on the substrate body surfaces, the substrate body material itself may contain a catalyst so that the brick presents catalyst material at the internal surfaces bounding the cells.

Exhaust gases from diesel (compression combustion) engines contain more nitrogen oxides than gasoline (spark combustion) engines. Long-term exposure to nitrogen oxides even at low levels can cause temporary or permanent respiratory problems. Selective catalytic reduction (SCR) is a method by which a liquid reductant is injected into a diesel engine exhaust flow to combine with nitrogen dioxide and nitric oxide (referred to collectively as $NO_x$) in the exhaust gas. A preferred reductant is aqueous urea $(2(NH_2)_2CO$ which is often referred to as diesel exhaust fluid (DEF). In the presence of a catalyst, ammonia resulting from thermal decomposition of the urea combines with the nitrogen oxides to produce less harmful products, chiefly nitrogen and water. Other reductants such as anhydrous ammonia and aqueous ammonia may also be used as an alternative to urea although especially for automotive application, on-board storage presents greater difficulty. Suitable catalysts may be any of certain metals oxides (such as those of molybdenum, vanadium, and tungsten), certain precious metals and zeolites. The typical temperature range for a SCR reaction is from 360° C. to 450° C. with a catalyst such as activated carbon being used to stimulate lower temperature reactions. As in gasoline (spark combustion engines), diesel (pressure combustion) engines may experience a period after a start-up where the exhaust temperature is too cool for effective SCR $NO_x$ reduction processes to take place. Other catalytic converters in which the present invention finds application for preheating or supplementary heating are lean NOX catalyst systems, lean NOX trap systems and non-selective catalytic reduction systems. The present invention is applicable also to each of these nitrogen oxide emissions treatment assemblies.

A gaseous emissions treatment assembly may have a series of the substrate bodies or bricks 10, each having a particular catalyst layer or emissions treatment mode depending on the noxious emission to be reduced or neutralized. Gaseous emissions treatment bricks may be made of materials other than fired ceramic, such as stainless steel. Also, they may have different forms of honeycombed cells or passages than those described above. For example, cells can be round, square, hexagonal, triangular or other convenient cross-sectional shape. In addition, if desired for optimizing strength and low thermal capacity or for other purposes, some of the extruded honeycomb walls can be formed so as to be thicker than other of the walls or formed so that there is some variety in the shape and size of cells. Junctions between adjacent interior cell walls can be sharp angled or can present curved profiles.

Typically, as shown in FIG. 1, the wash-coated ceramic honeycomb brick 10 is wrapped in a ceramic fibrous expansion blanket 16. A sheet metal casing or can 18 transitions between the parts of an exhaust pipe (not shown) fore and aft of the gaseous emissions treatment component so as to encompass the blanket wrapped brick. The casing 18 is typically made up of two parts which are welded to seal the brick in place. The expansion blanket 16 provides a buffer between the casing 18 and the brick 10 to accommodate their dissimilar thermal expansion coefficients. The metal of the sheet metal casing 18 expands much more than the ceramic material of the brick at a given temperature increase and, if the two materials were bonded together or in direct contact with each other, destructive stresses would be experienced at the interface of the two materials. The blanket 16 also dampens vibrations from the exhaust system that might otherwise damage the brittle ceramic of the substrate body 10.

In use, the encased brick (or bricks) is mounted in the vehicle exhaust line to receive exhaust gases from the engine and to pass them to the vehicle tail pipe. Exhaust gases 32 enter the front of the gaseous emissions treatment component 10 and treated exhaust gases 34 exit from its rear. In the course of passing along the cells, the exhaust gases the ceramic brick 10 and the catalyst coating is heated to promote treatment processes where the flowing gases contact the catalyst layer. Especially when the vehicle engine is being run at optimal operating temperature and when there is substantial throughput of exhaust gases, such treatment components operate substantially to reduce the presence of noxious gaseous emissions entering the atmosphere. Such components have shortcomings however at start-up when the interior of the brick is at low temperature, during idling during city driving or when waiting for a coffee at a Tim Hortons drive-through, and between electric driving periods for hybrid vehicles.

Brick shape, profile and cell densities vary among different manufacturers. For example, while most bricks are round, some are oval, square or irregular in cross-sectional shape. Some assemblies have single stage bricks that are generally heavily wash-coated with the catalyst metals, while others may have two or three bricks with different wash-coatings on each brick. Some exhausts have 900, 600 and 400 cpsi cell densities used in the full exhaust assembly, while others use only 400 cpsi bricks throughout. A close-coupled converter may be mounted up close to the exhaust manifold with a view to reducing the period between start-up and light-off temperature. An underfloor converter can be located further from the engine where it will take relatively longer to heat up but be relatively larger and used to treat the majority of gases once the exhaust assembly is up to temperature. In another configuration, a heater component for reducing the period to light-off temperature and a gas treatment component to deal with high gas flow after light-off are mounted together in a common casing.

At one or more locations in the assembly, sensors mounted in the exhaust gas flow including within or adjacent the substrate body provide feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition-not enough fuel. A lower ratio produces a rich condition-too much fuel. The start-up procedure on some vehicles runs rich for an initial few seconds to get heat into the engine and ultimately the catalytic converter. The structures and operating methods described below for indirectly heating the catalyst layers and the exhaust gases can be used with each of a close-coupled catalytic converter, an underfloor converter, and a combination of the two. Outputs from the temperature sensors are taken to a controller at which the monitored temperature or temperatures are used to control when induction heating is switched on and off. Using an appropriate algorithm implemented at the controller, the monitored temperatures may also be used to control specific effects of the applied heating processes to achieve a particular heating pattern.

Figure 2:
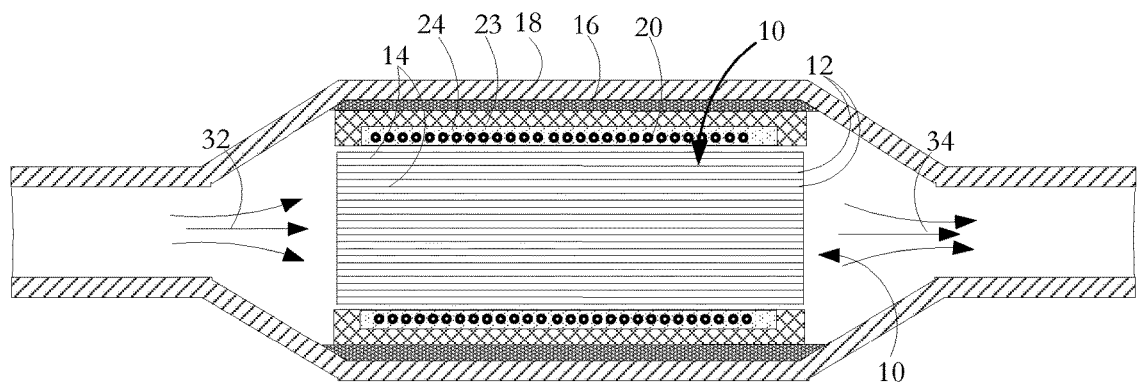
FIG. 2 is a longitudinal sectional view of a gaseous emissions treatment unit adapted for use in an embodiment of the invention.
Figure 3:
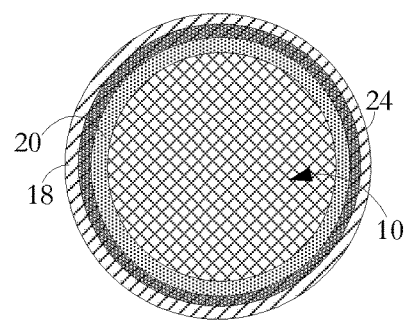
FIG. 3 is a cross-sectional view of the unit of FIG. 2.

As disclosed in U.S. Pat. No. 9,488,085, a gaseous emissions treatment assembly such as that shown in FIG. 1 is modified as shown in FIGS. 2 and 3 to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferromagnetic metal body, heat is also generated by a hysteresis effect. When the non-magnetized ferromagnetic metal is placed into a magnetic field, the metal becomes magnetized with the creation of magnetic domains having opposite poles. The varying field periodically initiates pole reversal in the magnetic domains, the reversals in response to high frequency induction field variation on the order of 1,000 s to 1,000,000s cycles per second (Hz) depending on the material, mass, and shape of the ferromagnetic metal body. Magnetic domain polarity is not easily reversed and the resistance to reversal causes further heat generation in the metal. In this specification, the word "metal" when used in the context of a "metal element" for use in induction heating, also encompasses non-metals, such as graphite, having high magnetic susceptibility.

As illustrated in FIGS. 2 and 3, surrounding the ceramic substrate body 10 is a metal coil 20 and, although not visible in FIG. 2, located within selected ones of the cells 12 are metal inserts 22 (FIG. 4) such as wires. By generating a varying electromagnetic field at the coil 20, a chain reaction is initiated, the end result of which is that after start-up of a vehicle equipped with an exhaust system embodying the invention, light-off temperature may be attained more quickly in the presence of the varying electromagnetic induction field than if there were no such field. The chain reaction is as follows: the varying electromagnetic field induces eddy currents in the metal elements; the eddy currents cause heating of the metal elements; heat from the metal elements is transferred to the ceramic substrate 10; heat from the heated substrate is transferred to exhaust gas as it passes through the converter; and the combined heat causes exhaust gas treatment reactions to take place sooner in the presence of the hot catalyst. As an alternative to a single coil, multiple coils or other forms of electromagnetic field generator may be sited next to the substrate for stimulating the eddy current and hysteresis effects.

The coil 20 is a wound length of copper tube, although other materials such as copper or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter.

A layer of 23 of electromagnetic field shielding material such as ferrite is located immediately outside the coil 20 to provide an induction shielding layer and to reduce induction loss to the metal converter housing 18. The ferrite 23 also acts as a flux concentrator material to increase inductive coupling to the ceramic substrate 10 to focus heating. Alternative flux concentrator materials and structures may be used including those disclosed in co-pending U.S. patent application Ser. No. 16/367,150, "Gaseous emissions treatment system with enhanced induction heating and method of use", which is incorporated herein by specific reference.

The coil is encased in cast and cured insulation 24. The cast insulation functions both to stabilize the coil position and to create an air-tight seal to confine passage of the exhaust gases through the ceramic honeycomb substrate 10 where the catalytic action takes place. The insulation 24 also provides a barrier to prevent the induction coil 20 from shorting on the converter can 18 or the ferrite shield 22. The insulation is suitably alumino-silicate mastic. In an alternative embodiment, the converter is wrapped in an alumino-silicate fibre paper. In one manufacturing assembly method, the copper coil 20 is wrapped around the ceramic substrate 10 and then placed in the converter casing or can 18.

In one embodiment of the invention, a varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage of 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An IGBT high speed switch is used to change the direction of electrical flow through the coil. In terms of the effect of a varying electromagnetic induction field on metal in the ceramic substrate, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements. Control systems for generating and varying power applied to an e.m. field generator are described in copending applications 15819324, "Emission control system with frequency controlled induction heating and methods for use therewith" and 15906275 "Emission control system with resonant frequency measurement and methods for use therewith", which are incorporated herein by specific reference.

As shown in the embodiment of 4 an array of wires having a uniform distribution through the array of converter cells 12 is used. In one example, one wire is inserted for every 25 cells of a 400 cpsi substrate. This has a satisfactory heating performance and not too great an occlusion of converter cells from the viewpoint of pollution-cleaning catalytic reactions implemented at the converter. A significantly higher ratio of wires to cells can result in slower heating to light-off because of the high overall thermal capacity represented, in total, by the wires and because of the fact that some wires block the 'line of sight' field effect on other wires. In contrast, while a significantly lower ratio of wires to cells results in fewer occlusions of converter cells, a sparse distribution of metal of the order of less than one wire inserted for every 49 cells in a 400 cpsi advantages and substrate results in reduced heat generation and increased time to light-off. In a further alternative, as described in co-pending U.S. patent application Ser. No. 15/907,698, which is incorporated herein by specific reference, a much higher packing density up to 1:2 pin to cell density is adopted for a special brick used as a front end 'slice' heater positioned directly in front of a treatment 'brick'.

In one embodiment, the distribution of inductance metal elements relative to the position of cells is configured so that the heating effect is generally uniform across the area of the converter. However, especially for start-up and idling, where non-uniform exhaust gas flow patterns may develop, there may be advantage in deliberately developing a heat pattern across the converter which is not uniform. This may be achieved in a number of ways. In one method, inductance metal elements are appropriately sited in selected cells. In another method, differently sized or shaped metal inserts are used. It may be also achieved by generating a non-radially symmetrical e.m. field or generating two or more interfering e.m. fields. Such induction heating fields and their interaction could, for example, be varied in the period from pre-start-up to light-off. Changing heating effects may also be achieved using a combination of such inductance metal siting and field manipulation. Targeted heating that varies in position, time, or both can be implemented with a view to increasing conversion of pollutants, to saving power, or for other reasons.

Induction heating produces a 'skin effect' surface heating of the metal being heated. This makes the surface area of the metal element important to efficient heating. Generally, the more surface area there is, the quicker the metal heats-up. However, induction is a line-of-sight process where the surface that 'sees' the inductive field is the one that heats-up first and gets hotter. Also, while large bodies heat up slowly, they conduct well throughout their bulk. Inserted pins offer a good compromise in terms of surface area, line-of-sight positioning and conduction characteristics, all of which significantly affect heating performance.

As previously described, metal elements 22 are located at selected locations in the cells 12 of the ceramic substrate 10. For two identical metal elements, a metal element 22 closer to the source of the induction field becomes hotter than an equivalent metal element located further away from the source because there is an increase in efficiency; i.e., the level of induction achieved for a given power input. With a regular induction coil 20 as illustrated, metal elements 22 at the outside of the cylindrical substrate 10 are near to the coil 20 and become very hot, while an equivalent metal element 22 near the substrate center remains relatively cool. An air gap between the coil 20 and the nearest inductance metal elements 22 prevents significant heat transfer from the metal elements 22 to the coil 20 which would otherwise increase the coil resistivity and so lower its efficiency. In an alternative embodiment, a relatively higher concentration of the metal elements is sited towards the center of the ceramic substrate to compensate for the fact that the field effect from the coil source is considerably less near the center of the substrate than near the outer part of the substrate. In a further embodiment, a relatively higher metal element load is located at some intermediate position between the center and perimeter of the ceramic substrate, whereby heat generated within the intermediate layer flows both inwardly to the center and outwardly to the perimeter for more efficient overall heating. The induction coil 20 is sized to the metal load to achieve high efficiency in terms of generating heat and in terms of speed to light-off.

The metal elements 22 may extend along the full length of any of the selected cells 12 or may extend partially along the cells as described in U.S. patent Ser. No. 10/143,967, "Catalytic converter structures with directed induction heating" which is incorporated herein by specific reference.

The electromagnetic induction field can be tuned to modify heating effects by appropriate selection of any or all of (a) the electrical input waveform to the coil, (b) nature and position of passive flux control elements, and (c) nature, position, and configuration of the coil 20. For example, the induction field is tuned to the location of metal elements or to the location of high concentration of such elements in the ceramic substrate 10. Alternatively, or in addition, the applied field is changed with time so that there is interdependence between the induction field pattern and the particular operational phase from pre-start-up to highway driving. In an alternative configuration, more than one coil can be used to obtain desired induction effects. For example, the ceramic substrate has an annular cross-section with a first energizing coil at the substrate perimeter and a second energizing coil at the substrate core.

As previously indicated, in one embodiment of the invention, the metal elements 22 are wires or pins which are inserted into selected substrate cells 12 using a method such as any of those described in co-pending U.S. patent application Ser. No. 15/486,369 "Methods for inserting wires in an induction heated gaseous emissions treatment unit" and which are retained within the cell by any of the methods described in U.S. patent application Ser. No. 15/486,358, "Methods for retaining wires in an induction heated gaseous emissions treatment unit", the specifications of each of which applications are incorporated herein by specific reference.

In another embodiment, the metal elements 22 are formed by injecting molten metal into the selected cells and solidifying the metal, or by injecting metal powder, melting and solidifying, each method being more fully described in co-pending U.S. patent application Ser. No. 15/972,187, "Gaseous emissions treatment components and methods for manufacturing thereof", which is incorporated herein by specific reference. The metal elements obtained upon solidification are essentially cast inside the cells. Because the interior wall surfaces of the cells are not perfectly smooth, the molten metal as it solidifies and conforms somewhat to the cell walls, provides some measure of mechanical retention.

In a further embodiment, as described in U.S. Ser. No. 15/972,187, the induction heating metal elements are deposited as successive layers of metal onto the cell wall surfaces either combined with catalyst material or before the catalyst wash-coat is applied. In one variation, the induction heating metal is applied as successive layers within selected cells until the cells are full or substantially full, the induction heating metal being then melted and solidified. Care is taken to ensure that central or other voids do not form and to ensure that the substrate is not damaged by the high melting temperature required. In a further variation, the induction heating metal is applied globally to the inner surfaces of all the substrate cells to a depth allowing the deposited metal to provide effective induction heating and for the remaining open area of the cells to ensure a desirable level of exhaust gas flow-through in operational use. The thickness of the induction heating coating is selected so as to leave an aggregate gas flow-through area about the same as that obtained for an equivalent inserted pin structure. For example, 1:16 (pin:cell) and 1:25 structures, 6.25% and 4% of the aggregate cell area are blocked, respectively. For a 600 cpsi substrate with 0.0025 inch thick cell walls, the open cell size is 0.0383 inches. This corresponding coating thickness is 0.0006 inches and 0.0004 inches respectively around the interior of each cell for the same blocked percentage. As a further variation, the use of a metal foil of desired thickness is contemplated.

When the inductively heated unit is in operational use, thermal conduction is the primary source of heat transfer from the heated metal elements through the ceramic substrate to the catalyst material. The disposition of the metal elements and the cells in which they are contained is configured to maximize the level and rate of thermal conduction between the metal elements and the catalyst. There may also be a relatively small amount of convective heat transfer but this is limited by the size of the air gaps, if any, between the heated metal elements and the interior surface of the cells because as the air gaps reduces in size, air movement is correspondingly reduced with there being no convection heating at all with no air gap. However, convection is the dominant mode of heat transfer between the heated substrate and the flowing exhaust gases in cells that are not occluded by induction heating metal elements. There is also a relatively small amount of radiation heat transfer where the metal elements are separated over a part of their surface area from an immediately adjacent cell interior wall of the cells and where the space between the separate features is not occluded by other material.

Figure 9:
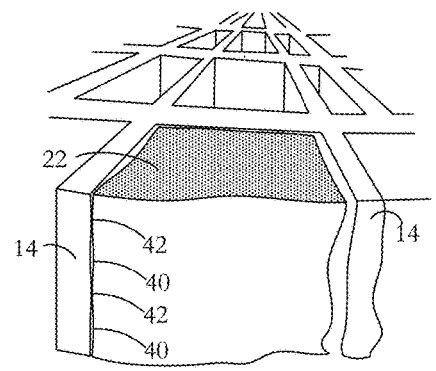
FIG. 9 shows a sectional view of a part of a gaseous emissions treatment unit according to yet a further embodiment of the invention showing a junction between the outer surface of a pin and the inner surface of a cell.

Ideally, the metal elements are closely received in respective cells with a minimum separation distance between the outer surface of a metal element and an adjacent cell wall being zero. In a practical embodiment, this will be the case at certain points along the length of the cell in the case for example of a straight pin in a wavy cell or a wavy pin in a straight cell. In both cases, the separation gap between the pin outer surface and the cell inner surface will be at minimum or maximum separations corresponding to the peaks or valleys of the wavy profile. As shown in FIG. 9, the separation gap is zero over short spans contact zones 42 and is of varying width over other zones 40 depending on the difference in effective diameters between the cell and the pin. Because of the more organic nature of ceramic substrates and their brittle structure, a substrate is not geometrically perfect and also does not straighten to accommodate the pins. This means that when deployed in a gaseous emissions treatment unit or a gaseous emissions heating unit, the pin or other metal element does most of the accommodating reshaping upon being inserted into or formed at its deployment position. When the gaseous emissions unit is operationally used at high temperature, further accommodating reshaping of the metal element occurs depending on the difference in thermal expansion coefficient between the pin and substrate materials. This can provide closer contact between the pin and cell, improving both thermal conduction and mechanical retention.

Figure 4:
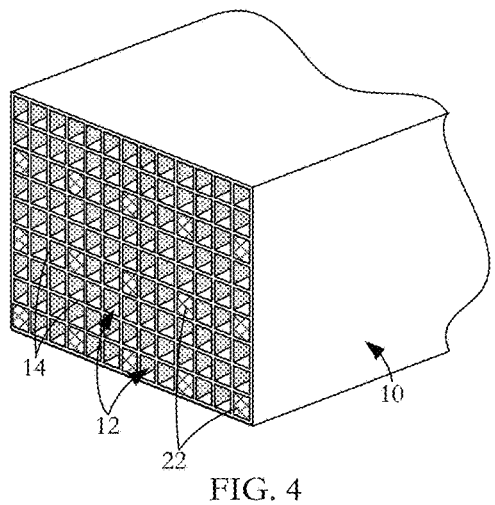
FIG. 4 is a perspective sectional view of a part of a gaseous emissions treatment unit according to an embodiment of the invention showing metal inserts located in cells of a substrate body.
Figure 8:
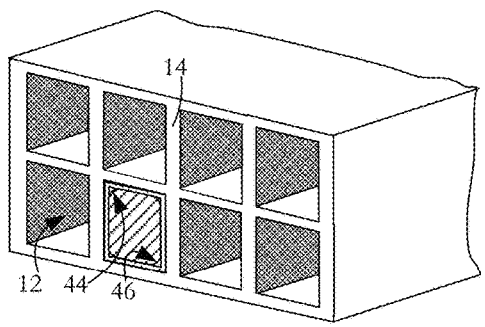
FIG. 8 is a perspective sectional view of a part of a gaseous emissions treatment unit according to yet a further embodiment of the invention showing metal insert and cell corner configurations of metal inserts bonded into cells of a substrate body.

In the case of pins or wires 22, in order to maximize thermal conduction between the pin and the immediately surrounding substrate material, in one embodiment of the invention, the pin has a cross-sectional profile which matches - i.e., is complementary to - the cross-sectional profile of the immediately surrounding substrate material as shown in the square profiles of FIG. 4. The cross-sectional areal shape of the pin 22 and the cell 12 can be any of, for example, round, oval, polygonal or any other suitable cross-section. Clearly, to enable pin insertion at the time of manufacture, the cell must be slightly bigger in area terms than the pin. While a nominally zero separation gap 44 provides the best conditions for heat transfer from a pin 22 to the adjacent parts of the substrate, wire stock for the inserted pins is drawn to be, on average, 0.002 inches to 0.005 inches less in width than the width of the accommodating cell in order to facilitate pin insertion. For a polygon section pin, as shown in FIG. 8, the cell corner 44 is sharper than the pin corner 46 to reduce the risk of corner binding during pin insertion. For example, for a square pin and cell, the pin corner radius is typically about one quarter to a third of the pin effective radius and the corner radius of the substrate is typically about one seventh to a fifth of the cell effective radius, the radius of the pin corner being therefore about twice the radius of the cell corner.

Figure 5:
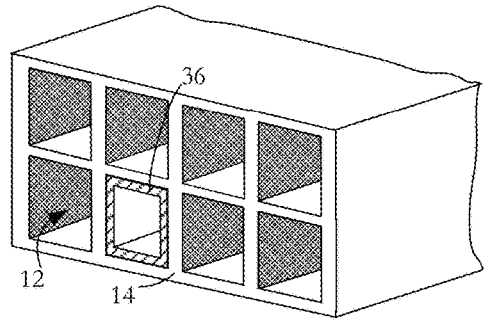
FIG. 5 is a perspective sectional view of a part of a gaseous emissions treatment unit according to another embodiment of the invention showing metal inserts located in cells of a substrate body.

In another embodiment of the invention, as shown in FIG. 5, a hollow pin 36 as described in U.S. patent Ser. No. 10/143,967 is used, but in which the cross-sectional outer profile of the pin substantially matches or complements the interior profile of the surrounding cell. The hollow pin 36, while functioning as an induction heating element, allows exhaust gas to pass along the cell. Consequently, other design parameters being equal, system back pressure which reduces engine performance is reduced compared with the use of solid wires. Outer profiles of hollow pins such as round, oval, polygonal, etc., can be used for the adjacent pin and cell surfaces and the interior pin profile shape may or may not match the pin exterior profile shape. The interior of the hollow pin may be coated with catalyst material for assisting in promoting or accelerating the gas exhaust treatment reactions. As with the solid pines, the space between a hollow pin and its surrounding cell walls may be filled with catalyst material as part of the general wash-coating of the substrate so as to improve thermal conduction between the pins and the substrate.

Figure 6:
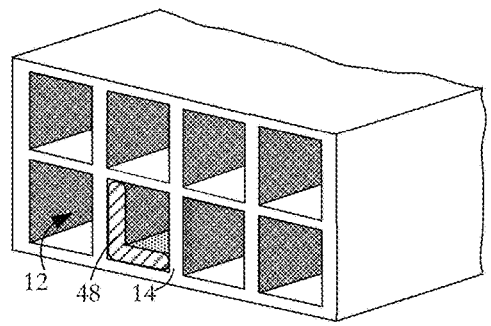
FIG. 6 is a perspective sectional view of a part of a gaseous emissions treatment unit according to a further embodiment of the invention showing metal inserts located in cells of a substrate body.

In another embodiment of the invention, as shown in FIG. 6, an L-section wire 48 positioned in a square section cell 12 is used predominantly to heat two side walls of the cell, with the non-occupied parts of the cell being open to present a significant area that is open to exhaust gas flowing along the cell and to present the other two, catalyst covered, sides of the cell to initiate or enhance treatment of the exhaust gas flowing through the cell.

With a change from solid wire cross-section to non-solid wire cross-section (including actual hollow, L, C, U, V and like 'open' form shapes), induction field absorption characteristics also change. With a thinner cross-section compared with a solid wire, a higher induction coil switching frequency is used so as to shorten the penetration depth into the wire, to thereby match the reduced thickness and, in turn, to increase thermal conversion efficiency.

Figure 7:
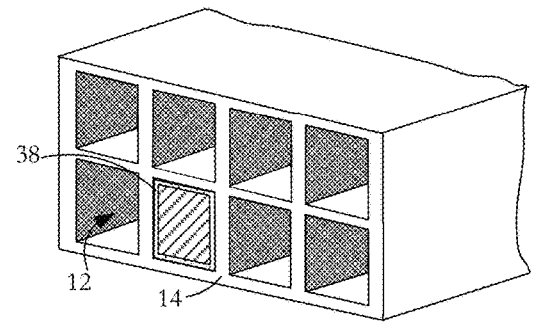
FIG. 7 is a perspective sectional view of a part of a gaseous emissions treatment unit according to yet another embodiment of the invention showing metal inserts bonded into cells of a substrate body.

In each of the solid, hollow and open pin embodiments, higher thermal conduction can be achieved by constructing a composite structure in which a pin is bonded to its surrounding cell wall. As shown in FIG. 7, a thin bonding layer 38 consisting of ceramic a mastic/glue generally having properties matching those of the ceramic substrate and with a thermal conductivity higher than air is used. In FIG. 7, the pin and cell are shown having facing walls that are flat and parallel. In actual practice, these surfaces are unlikely to be either completely flat or exactly parallel. Alternatively, as shown in the more realistic representation of FIG. 9, bonding is achieved by applying the catalyst wash-coat to the substrate cells 12 after the pin 22 is inserted so that the wash-coat permeates and fills air gaps 40 in the occupied cells and cures there.

In another embodiment of the invention, a ferromagnetic metal coating is formed on the interior surfaces of walls of selected converter cells before application of a catalyst coating. Alternatively, the induction heating metal coating is laid down as a common coating with the catalyst metal, either by using alloy particles that contain both ferromagnetic metal and catalyst metal or by having a wash in which both ferromagnetic metal particles and catalyst particles are dispersed. In the latter arrangements, there may be some loss of catalyst action arising from the ferromagnetic metal occupying some of the catalyst metal sites and so a compromise is necessary.

All metals are responsive to some extent to an induction field, with ferromagnetic metals being the materials most readily heated by such a field. Catalyst materials contained within a wash coat applied to a honeycomb substrate cell interior are typically platinum group metals-platinum, palladium and rhodium. Such materials have a low magnetic permeability of the order of $1 \times 10^{-6}$ (in the case of platinum) and so are influenced only very slightly by an applied induction field. Moreover, catalyst metals are present in very tiny amounts of the order of a gram per converter brick so there is insufficient metal in the catalyst assembly to generate and transfer any noticeable heat to the ceramic substrate in start-up period or idling periods. In contrast, ferromagnetic metals used for the induction heating are present in an amount of the order of 60 to 200 grams per brick and have magnetic permeability of the order of $2.5 \times 10^{-1}$ in the case of iron.

As previously indicated, induction heating is applied in the period before light-off in order to reduce the amount of harmful pollutants which are emitted before the catalyst coatings have reached a temperature at which they start to catalyze reactions in which the pollutants are converted to more benign emissions. Particularly for city driving, engine operation is frequently characterized by bursts of acceleration and braking punctuated by periods of idling. At such times, the temperature of the exhaust gas entering the converter and the walls of the substrate with which the flowing exhaust gas is in contact may start to fall. If the idling and the cooling continue, the temperature of the substrate and the gas fall below that required for the pollutant-reducing catalytic reactions to occur. In such periods, heating of the converter substrate is obtained by switching on the induction heating. At a future point, when the vehicle is no longer idling and the exhaust gas temperature increases past the temperature required for effective catalytic reaction to convert the toxic exhaust gas pollutants to relatively benign products, the induction heating is switched off.

Embodiments of the induction heating invention have been described in the context of ferromagnetic alloys such as steel which are commercially available in common shapes and sizes, and at reasonable cost. Alternative ferromagnetic metals such as cobalt or nickel or their alloys may also be used. The metal used must survive high temperature reached by the catalytic converter and repeated temperature cycling as the metal intrusions move repeatedly from a cold start to operating temperature and back again. Generally, alloying of iron or other ferromagnetic metal gives advantageous mechanical and physical properties such as corrosion/oxidation resistance, high temperature stability, elastic deformation, and formability.

A benefit of induction heating is that converter assemblies can be smaller. A cold start produces 75 to 90% of the pollutants of an internal combustion engine and this drives the size of the overall exhaust assemblies. Since the induction heating technology addresses much of this 75 to 90%, there is the ability to shrink the converter package.

National emissions standard requirements are a prime driver for catalytic converter design. The requirements are very high and difficult to meet by with a single converter. Currently, therefore, most cars now in production employ a two converter assembly-one at a close-coupled position and the other at an underfloor position. The close-coupled converter is normally lighter in weight than the underfloor converter which means that is has low thermal capacity and so will attain a catalytic reaction operating temperature as quickly as possible. However, the close-coupled converter is of relatively lower efficiency compared with the heavier underfloor converter once the two converters have reached their respective catalytic reaction operating temperatures. By introducing induction heating to the exhaust process at start-up, it may be manufacturers can return to a single converter installation and meet emission standards by eliminating the need for the close-coupled converter.

Although embodiments of the invention have been described in the context of ceramic catalytic converter substrates, stainless substrate substrates can also be used, with induction heating being implemented in a similar way to that described above. Substrates made of 400 series magnetic alloys are preferred because such alloys exhibit significant magnetic hysteresis. With a surrounding coil, the outer annular regions of small diameter stainless steel substrates heat up extremely quickly owing to their small thermal capacity.

What is claimed is:

1. A gaseous emissions treatment component, comprising
a honeycomb substrate having a plurality of elongate cells for the passage of gaseous emissions through the substrate, the cells bounded by walls dividing adjacent cells from one another,
elongate metal elements closely received in respective ones of some of the cells, at least a part of an outer surface of each metal element being immediately adjacent and facing a corresponding part of an inner surface of the cell within which the metal element is located, the at least a part of the outer surface of the metal elements generally matching, in cross-sectional profile, the corresponding inner surface part of the respective cell, and
wherein the at least a part of the metal element outer surface and the at least a part of the inner surface of the immediately adjacent part of the cell have both areas of contact and areas of spacing therebetween.

2. The gaseous emissions treatment system of claim 1, wherein the at least a part of the outer surface of the metal element is one of round, oval and polygonal.

3. The gaseous emissions treatment system of claim 1, wherein the at least a part of an outer surface of each metal element is the full perimeter of the metal element.

4. The gaseous emissions treatment component of claim 1, wherein the at least a part of the inner surface of the immediately adjacent part of the cell has surface irregularities complemented by surface irregularities in the at least a part of the metal element outer surface.

5. The gaseous emissions treatment component of claim 1, wherein the metal elements are cast within the respective cells within which the metal elements are located.

6. The gaseous emissions treatment component of claim 1, wherein material of the metal element is metal deposited onto the immediately adjacent part of the cell within which the metal element is located.

7. The gaseous emissions treatment component of claim 1, wherein the metal of the metal elements is a ferromagnetic metal.

8. The gaseous emissions treatment component of claim 1, wherein the honeycomb substrate is made of ceramic material.

9. The gaseous emissions treatment component of claim 1, wherein the metal elements are inserted wires.

10. The gaseous emissions treatment component of claim 9, wherein the inserted wire is, on average, 0.002 inches to 0.005 inches less in width than the width of the cell within which the wire is located.

11. The gaseous emissions treatment component of claim 1, wherein at least some of the areas of spacing contain a material bonding the metal element to the cell.

12. The gaseous emissions treatment component of claim 11, wherein the bonding material has higher thermal conductivity than air.

13. The gaseous emissions treatment component of claim 11, wherein at least some of the bonding material is catalyst material to enhance a gaseous emissions treatment reaction.

14. The gaseous emissions treatment component of claim 11, wherein the bonding material is a mastic glue for ceramics.

15. A gaseous emissions treatment system comprising
the gaseous emissions treatment component of claim 6 and
a magnetic field generator mounted adjacent the gaseous emissions treatment component for radiating a varying magnetic field in response to a control signal thereby to inductively heat the gaseous emissions treatment component.

16. A gaseous emissions treatment component, comprising
a honeycomb substrate having a plurality of elongate cells for the passage of gaseous emissions through the substrate, the cells bounded by walls dividing adjacent cells from one another,
elongate metal elements closely received in respective ones of some of the cells, at least a part of an outer surface of each metal element being immediately adjacent and facing a corresponding part of an inner surface of the cell within which the metal element is located, the at least a part of the outer surface of the metal elements generally matching, in cross-sectional profile, the corresponding inner surface part of the respective cell, and
wherein the elongate metal elements have cross-sectional shapes that are one of hollow and open form.

17. A gaseous emissions treatment component, comprising
a honeycomb substrate having a plurality of elongate cells for the passage of gaseous emissions through the substrate, the cells bounded by walls dividing adjacent cells from one another,
elongate metal elements closely received in respective ones of some of the cells, at least a part of an outer surface of each metal element being immediately adjacent and facing a corresponding part of an inner surface of the cell within which the metal element is located, the at least a part of the outer surface of the metal elements generally matching, in cross-sectional profile, the corresponding inner surface part of the respective cell, wherein the at least a part of an outer surface of each metal element contact the corresponding part of an inner surface of the cell within which the metal element is located at a contact zone.

18. The gaseous emissions treatment component of claim 17, wherein
the metal elements are inserted wires,
the outer surface part and the inner surface part are separated by a separation gap at a non-contact zone, and
the width of the separation gap depends on a difference in effective diameters of the cell and the wire.

19. The gaseous emissions treatment component of claim 18, wherein
one of the outer surface part and the inner surface part has a wavy profile and
the width of the separation gap varies in dependence on peaks and valleys of the wavy profile.

20. The gaseous emissions treatment component of claim 19, wherein
the inner surface part has a first profile and the outer surface part has a second profile, and
the second profile has a shape at least partly formed by the wire having been reshaped arising from heating of the wire and the substrate and a resulting contact between the wire and the substrate.

* * * * *